(12) United States Patent
Farkash et al.

(10) Patent No.: US 8,952,810 B2
(45) Date of Patent: Feb. 10, 2015

(54) SYSTEM AND METHOD FOR AUTOMATED/SEMI-AUTOMATED ENTRY FILTERING

(75) Inventors: Aharon Zeevi Farkash, Tel Aviv (IL); Shahar Belkin, Moshav Kochav Michael (IL)

(73) Assignee: FST21 Ltd, Tel-Aviv (IL)

( * ) Notice: Subject to any disclaimer, the term of this patent is extended or adjusted under 35 U.S.C. 154(b) by 299 days.

(21) Appl. No.: 12/922,919

(22) PCT Filed: Mar. 15, 2009

(86) PCT No.: PCT/IL2009/000290
§ 371 (c)(1),
(2), (4) Date: Sep. 16, 2010

(87) PCT Pub. No.: WO2009/116030
PCT Pub. Date: Sep. 24, 2009

(65) Prior Publication Data
US 2011/0012732 A1    Jan. 20, 2011

(30) Foreign Application Priority Data
Mar. 17, 2008 (IL) .......................................... 190232

(51) Int. Cl.
*G08B 21/00* (2006.01)
*G10L 17/26* (2013.01)

(52) U.S. Cl.
CPC ..................................... *G10L 17/26* (2013.01)
USPC ....................... 340/540; 340/545.1; 340/691.1

(58) Field of Classification Search
USPC ................ 340/540, 545.1, 546, 545.6–545.9, 340/568.1, 679–680, 691.1, 691.6
See application file for complete search history.

(56) References Cited

U.S. PATENT DOCUMENTS

| | | | |
|---|---|---|---|
| 5,731,785 A | 3/1998 | Lemelson et al. | |
| 6,069,655 A * | 5/2000 | Seeley et al. ................. | 348/154 |
| 6,850,252 B1 * | 2/2005 | Hoffberg ...................... | 715/716 |
| 8,099,668 B2 * | 1/2012 | Garbow et al. .............. | 715/751 |
| 2003/0006879 A1 * | 1/2003 | Kang et al. ................... | 340/5.61 |
| 2003/0023444 A1 | 1/2003 | St. John | |
| 2003/0081747 A1 | 5/2003 | Ahlstrom et al. | |

(Continued)

FOREIGN PATENT DOCUMENTS

| | | |
|---|---|---|
| JP | 7101265 | 4/1995 |
| WO | WO 03075243 | 9/2003 |
| WO | WO 2008098188 | 8/2008 |

OTHER PUBLICATIONS

International search report for Application No. PCT/IL09/00290 mailed on Jul. 8, 2009.

(Continued)

*Primary Examiner* — Daniel Previl
(74) *Attorney, Agent, or Firm* — Pearl Cohen Zedek Latzer Baratz LLP

(57) ABSTRACT

An automated gatekeeper system and method are disclosed. The system and method comprise a control unit, sensors monitoring a checkpoint and gates to controlled premises and controllable gates. A person who wishes to enter may be inquired by the system in order to monitor and identify his or her identity, to verify whether the identified person is listed in at least one list of classified persons and to define whether that person is in a state of mind or mood which may have implication on the decision whether to allow his or her entrance to the premises.

9 Claims, 3 Drawing Sheets

(56) References Cited

U.S. PATENT DOCUMENTS

| | | | |
|---|---|---|---|
| 2003/0132830 A1* | 7/2003 | Dow et al. | 340/5.22 |
| 2004/0088584 A1* | 5/2004 | Shachar et al. | 713/201 |
| 2004/0093218 A1* | 5/2004 | Bezar | 704/273 |
| 2004/0153553 A1 | 8/2004 | Chotkowski | |
| 2006/0028556 A1* | 2/2006 | Bunn et al. | 348/211.99 |
| 2007/0233323 A1* | 10/2007 | Wiemeyer et al. | 700/276 |
| 2008/0055423 A1 | 3/2008 | Ying et al. | |
| 2008/0158052 A1 | 7/2008 | Chen et al. | |

OTHER PUBLICATIONS

Office Action from IL Application No. 200219 dated Jan. 23, 2013.

* cited by examiner

SYSTEM AND METHOD FOR AUTOMATED/SEMI-AUTOMATED ENTRY FILTERING

CROSS-REFERENCE TO RELATED APPLICATIONS

This application is a National Phase Application of PCT International Application No. PCT/IL2009/000290, International Filing Date Mar. 15, 2009, entitled "System and Method for Automated/Semi-Automated Entry Filtering" published on Sep. 24, 2009 as International Publication No. WO 2009/116030, claiming priority of IL Patent Application 190232, filed Mar. 17, 2008, each of which are incorporated herein by reference in its entirety.

BACKGROUND OF THE INVENTION

Safety of offices, condominiums and other places where certain people are authorized to enter and exit as they wish, others may not be allowed to enter at all times and others may be allowed to enter and/or exit only upon authorization is traditionally addressed by physical closing means such as gates, doors and the like and by doorman facilities. Such traditional safety and entry control systems suffer of certain drawbacks such as failure to correctly identify persons who are not allowed to enter and/or exit the controlled premises or persons who are allowed to. Some of the reasons for these failures are sourced from the limited capability of a human doorman to correctly classify a person who intends to enter or to exit the controlled premises as being authorized, to correctly identify the level of the authorization and certain conditions to correctly identify his intentions.

SUMMARY OF THE INVENTION

An automated gatekeeper system and method are disclosed. The system and method comprise a control unit in operational connection with sensors monitoring a checkpoint and gates to controlled premises and with controllable gates. A person wishes to enter may be inquired in order to monitor and identify his or her identity, to verify whether the identified person is listed in at least one list of classified persons and to define whether that person is in a state of mind or mood which may have implication on the decision whether to allow his or her entrance to the premises. The verification of the mood or state of mind of the person may rely on inputs from the sensors, such as optical sensors of stills or video photos, infra-red sensors, proximity sensors and the like and further on personal and general profiles of types of behavior to be used, for example, as reference to behavior reflected for example by the sensors. In case the automated gatekeeper of embodiments of the invention prevents entry of a person to the premises it may further connect to a manned central unit which may monitor the situation at the automated gatekeeper and issue further inquiries or decide to dispatch an intervention force to the premises.

BRIEF DESCRIPTION OF THE DRAWINGS

The subject matter of embodiments of the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
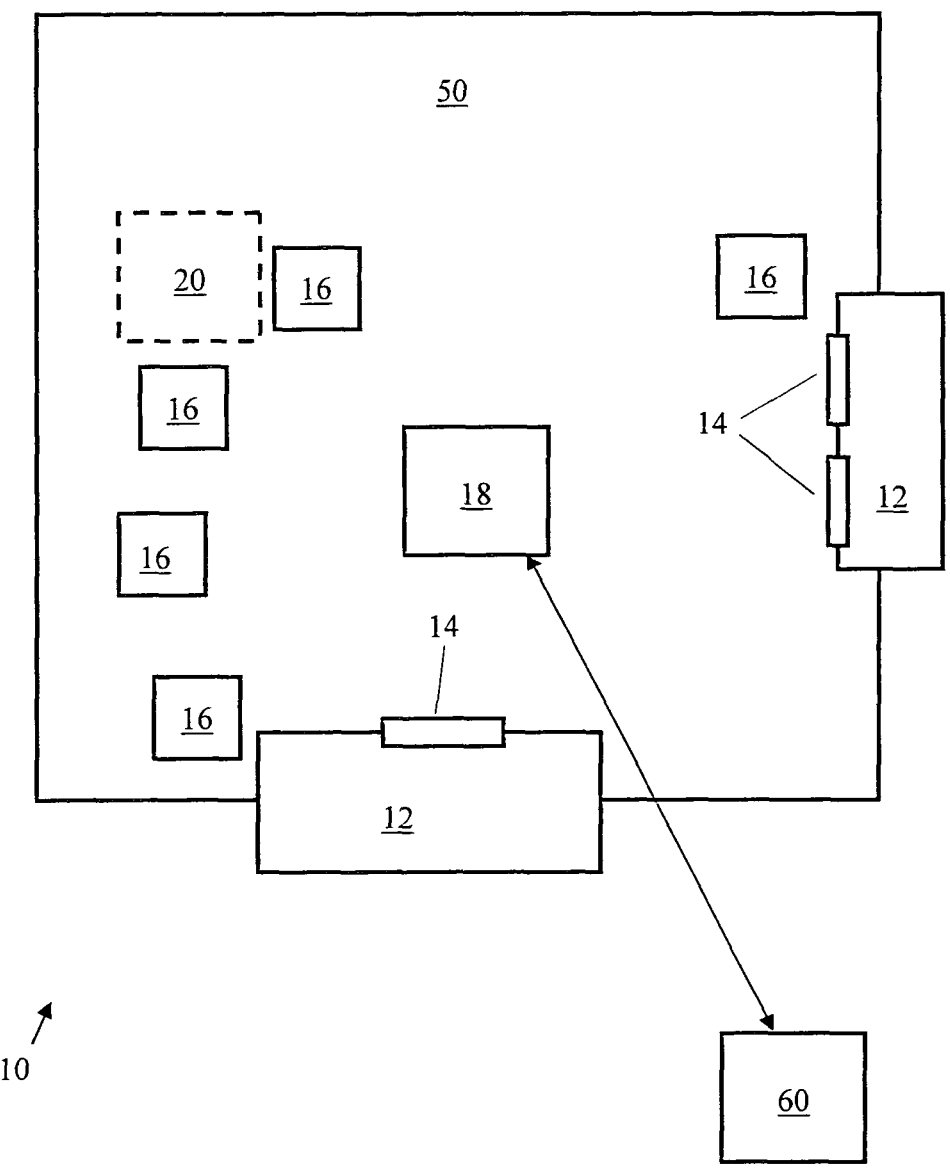
FIG. 1 is a schematic block diagram of a doorman system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some of the reasons for failure of a human doorman to accomplish his duty to properly classify and filter people wishing to enter and/or to exit the premises he is guarding are the limited ability of a human doorman to execute authentication, to conclude real intentions of that person, especially if there are hostile intentions, and the limited ability to aggregate additional information from additional sources, such as video cameras, lists comprising names of persons with limited reliability or limited level of authorization and the like.

The present invention discloses systems and methods for overcoming these drawbacks and some others by constructing a multi-level doorman functionality which involves automated classifying and screening doorman functionality with human decision making functionality and a human intervention force. Attention is made now to FIG. 1, which is a schematic block diagram of a doorman system 10 according to embodiments of the present invention. Doorman system 10 may comprise one or more entry checkpoints 12 to premises 50, a plurality of controllable gates 14, a plurality of sensors 16 and at least one control unit 18. Optionally system 10 may further comprise controllable entry/exit means 20 such as an elevator. Checkpoint 12 may typically be located next to controllable gate 14 and may be in operative connection with it. Checkpoint 12 may comprise and/or be associated with a plurality of sensors 16 such as video camera, microphone, electronic weigh scale, proximity sensor, infra red (IR) sensor and the like. Checkpoint 12 may be constructed to allow a person, who wishes to enter or exit controlled premises 50, to stand close to checkpoint 12 or enter into it or otherwise be in a position that allows system 10 to examine the person by one or more sensors 16, such as taking his still picture and/or his video picture, listen to his vocal output, weighing his weight and the like.

Checkpoint 12 may also be constructed to allow a person to get instructions from and/or be inquired by system 10 in order to, in a non-limiting example, get a vocal input for a state-of-mind analysis, to instruct the person to take further actions, and the like. Such instructions may be given vocally, for example via a loudspeaker, in a written form, for example displayed on a screen, and the like. Checkpoint 12 may also be constructed to prevent a person from entering premises 50 via controllable gate 14 if authorization for this was not given and/or to prevent a person from exiting premises 50 if authorization was not given. Controllable gate 14 may be a door system that is openable only upon authorization from system 10. Controllable gate 14 may be an elevator 20 the doors of which are openable only upon authorization from system 10 and/or that may stop only at a floor which was approved by system 10.

One or more sensors 16 may be located at and/or inside and/or in association with elevator means 20 including a weigh transducer which may transmit weigh readings of a person inside elevator means 20. Elevator 20 may also include notification means such as a loudspeaker and/or a display. The weigh of a person in elevator 20 may be transmitted to control unit 18 and be compared with data entries representing known weigh of authorized persons. According to some embodiments of the present invention elevator means 20 may act as checkpoint 12, where a person wishing to enter premises 50 may be communicated with and be inquired by control unit 18. According to embodiments of the present invention the entrance of that person may be fully controlled so as to allow arriving at a requested floor and be allowed to exit elevator 20 only if all relevant terms and conditions relating to that person are met.

Control unit 18 may comprise interface means (not shown) to controllable gate 14, to sensors 16, to loudspeaker and display (not shown) located in or proximal to checkpoint 12 and to the control (not shown) of elevator 20. Control unit 18 may further comprise data storage means (not shown) to hold data representing authorization certificates, data describing personal aspects of people which are usually authorized to enter and exit premises 50, general information characterizing people of different groups, such as male, female, children, youngsters, grown up, old people, etc. The data storage means may further comprise computer programs, such as personal enquiry program, which will be described later, and the like. Control unit 18 may further comprise active link to at least one security control center 60.

Control center 60 may typically be located remotely from premises 50 and be in active communication with system 10. Control center 60 may be manned with security personnel trained to monitor the operation of system 10 and to react to situations which are beyond the handling capacity of system 10. Such situations may be a mismatch of identity parameters, for example an entering person who voices a name of a rightful tenant but the voice does not match the parameters of vocal signature of the named person. According to embodiments of the present invention control center 60 may be in communication with more than one system 10. Control center 60 may further be associated with and have control over one or more intervention force which may, at a command issued by control center 60, approach system 10 if, based on data which exchanged between control center 60 and system 10, assistance is needed at premises 50, in order to take necessary actions at premises 50.

Figure 2:
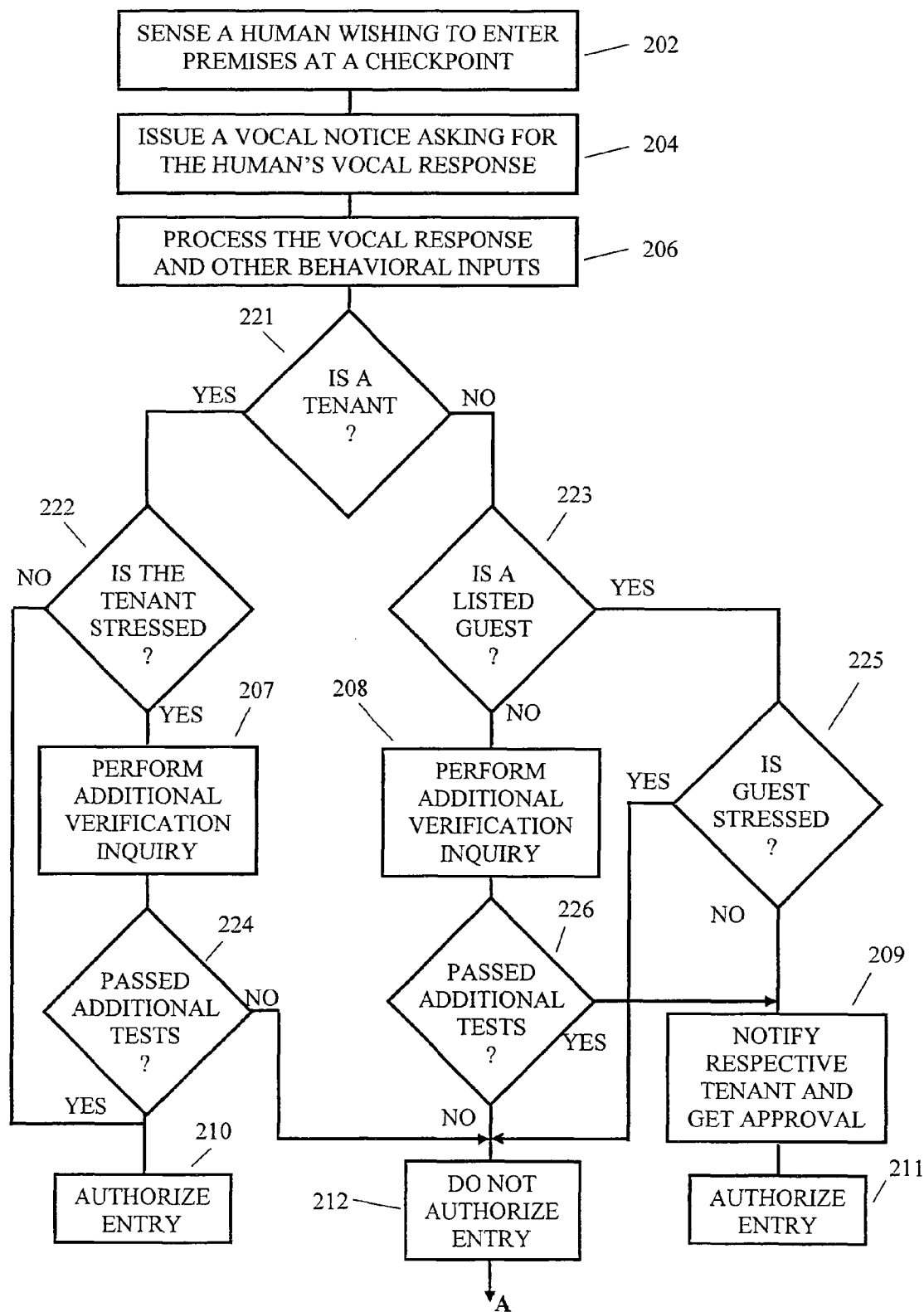
FIG. 2 is a schematic flow diagram illustrating a process of authenticating a person at a check point according to embodiments of the present invention.

Reference is made now also to FIG. 2, which is a schematic flow diagram illustrating a process of authenticating a person at a check point 12 according to embodiments of the present invention. Control unit 18, when executing one or more of the programs stored in it, may sense, using at least one of sensors 16, that a person is present at one of its checkpoints 12, on his or hers way into premises 50 (block 202). Control unit 18 may then issue a notification, such as a vocal notice, greeting the entering person and requesting his vocal response (block 204). The notice from control unit 18 may request the entering person, as a non-limiting example, to pronounce his or her name. Control unit 18 may receive the person's vocal or other response through at least one of sensors 16 and analyze it. The analysis may include voice recognition, state of mind analysis to identify extreme states such as stress, anxiety and the like. The analysis may further rely on video input and analyze it in order to identify extreme state of mind and/or to rely on still picture for similar identification and/or for identity check. Control unit 18 may further rely on data stored in the storage means, such as voice samples, pictures, behavioral parameters etc. and statistics of such data. If required, in order to achieve a defined level of confidence, control unit 18 may iterate the inquiry process (block 206), possibly using information and analyzed data accumulated during previous iterations of the inquiry process. Analysis of identity of the person at checkpoint 12 may further refer to, or rely on personal information such as the height of the person, the weight of the person, weight evaluation based on still and/or video photos, typical walking pace, typical entering (or leaving) hour and the like.

The results of the analysis of block 206 may then be checked first at decision point 221 to verify if the person at checkpoint 12 is a tenant of premises 50 or not. This verification may be done versus a set of describing parameters of tenants of premises 50 stored in the storage means of control unit 18. If the decision as decision point 221 is YES then a further decision is taken at decision point 222, to verify whether the identified tenant is stressed or disturbed or expressed anxiety beyond a defined level. This verification may be done based on the information that was already collected and/or analyzed during previous steps. One type of information that may be used, for example, to verify existence of stress may be an unrest behavior of the person, as reflected in video photos of the person, and analyzed by control unit 18. If the result at decision point 222 is negative it may mean that the tenant may be allowed to enter premises 50 and an authorizing signal to gates 14 may be issued by control unit 18 (block 210). If, however, the result at decision point 222 is positive further inquiry may be performed, as will be discussed below, with respect to block 207, to further investigate if the level of anxiety is a reason to not allow entry for this tenant. A high level of stress or anxiety may signal that the tenant is subject to threat, such as he or she is forced to enter premises 50 by a hostile element against his/her own will, for example when a hostile element forces a tenant to exercise his/her authorization in order to enter premises 50. Thus, according to embodiments of the present invention, a further inquiry may be performed (block 207), in order to more accurately evaluate the level, and preferably the nature of stress, anxiety or disturbance. If, at decision point 224, the inquired tenant has passed the additional tests, an authorization to open the respective gate 14 may be given by control unit 18 (block 210), to allow entry of the tenant into premises 50. Failure, at decision point 224, of the inquired tenant to pass the additional tests will result refusal of system 10 to allow entry of the tenant into premises 50 (block 212) and may pass further handling of the entry request to control center 60, as discussed in details below.

If, at decision point 221, the person at checkpoint 12 was not identified as a tenant of premises 50 a further decision will be taken, at decision point 223, whether the person wishing to enter is identified as a person in a pre-prepared list of guests. If the person is identified as listed in a list of guests (positive decision) the level of stress or anxiety of his/her will be verified at decision point 225, to check if such stress or anxiety exist and is higher than a defined level, similarly to the process discussed above with respect to decision point 222 and block 207. Similar methods of verification and analysis as discussed above may also be exercised here in order to measure whether the level of stress or anxiety has passed a defined threshold. In case the identified level of stress or anxiety is beyond the defined threshold (positive result) this guest will not be allowed to enter premises 50 (block 212) and further handling of the entry request may be passed to control center 60, as discussed in details below. In case the identified guest has passed the decision point 225 with negative result a notification of the expected arrival of the guest may be issued by control unit 18 to the respective tenant (block 209) and the guest will be allowed to enter premises 50 by issuing an opening signal to the respective gate 12 (block 211).

If, at decision point 223 the person wishing to enter to premises 50 was not identified as a listed guest (negative decision) additional verification steps may be carried out (block 208) by control unit 18, in order to verify whether the person has hostile intentions. This verification process may exercise several automated inquiry processes, using the voice, still pictures and movie pictures of the examined person as behavioral inputs. Control unit 18 may further use additional types of data, such as typical behavioral parameters for the group to which the inquired person may belong, in order to normalize the responses of the person. If, at decision point 226, the person has passed these additional tests (positive result) the process of block 209, which was discussed above, will be performed to notify the respective tenant of the expected visit and the respective gate 12 will be notified to open (block 211). If, at decision point 226, the person has not passed the additional test (negative result) the request of this person to enter premises 50 will be handled (block 212) as were handled previously denied tenant or denied guest.

A fine examination of existence of stress or anxiety may be performed based on, for example, voice analysis and video analysis of voice stream resulting from the vocal response of the examined person to inquiring questions issued by control unit 18 or based on video behavioral analysis performed on a video stream of frames presenting the examined person at checkpoint 12 when the further inquiry is performed. The analysis of the voice and/or video of the examined person may rely, for example, on relevant data stored on storage means of control unit 18, such as previous voice samples, previous voice representing parameters, behavioral characteristics, etc. If the result of the further inquiry of block 208, as detected at decision point 224, is 'passed' then an authorizing signal to gates 14 may be issued by control unit 18 (block 210) and optionally a notification to the tenant respective to a guest may be issued (block 209), notifying him or her of the expected visit. In case when the result at decision point 223 in negative or the result in decision point 224 is 'not passed' then the entry of the person at checkpoint 16 will be denied (block 212).

Figure 3:
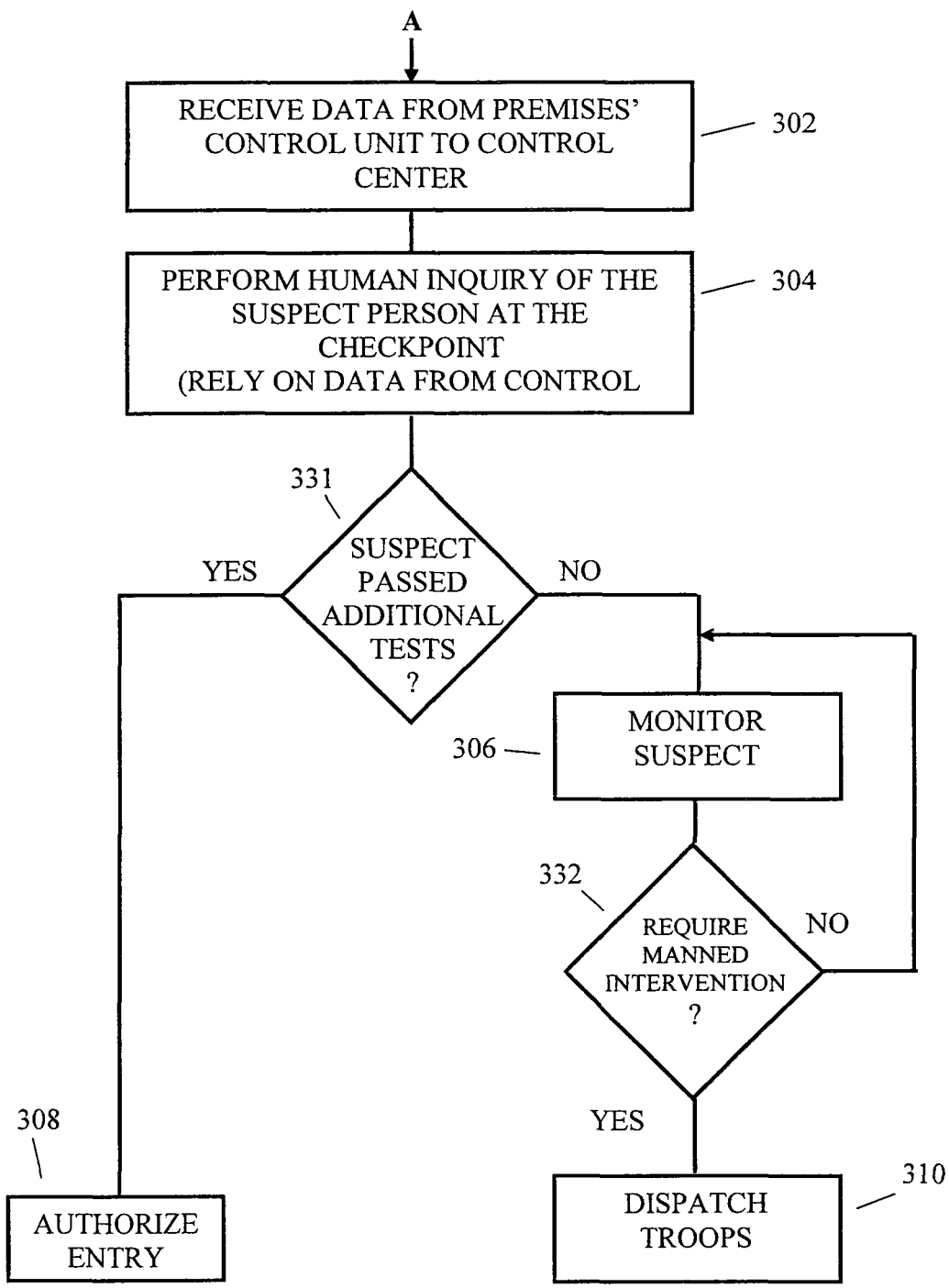
FIG. 3 is a schematic flow diagram of an escalation process, according to embodiments of the present invention.

In case the requested entry of a person to premises 50 is denied system 10 and/or control center 60 may initiate an 'escalation' procedure, aimed to provide additional counter means for handling a potentially deteriorating security situation at premises 50. A communication link may be established, allowing exchange of data, voice, video and the like between system 10 and control center 60. System 10 may provide control center 60 with relevant data which was collected during the examining sessions, the decisions that were taken at each decision point and the like. Attention is made now to FIG. 3, which is a schematic flow diagram of an escalation process, according to embodiments of the present invention. Flow diagram of FIG. 3 begins at point A of FIG. 2. Data from system 10 may be provided to control center 60 via a communication (block 302) providing voice link, video link, data link and the like so that the situation at system 10 may fully be reflected and monitored by control center 60.

According to embodiments of the present invention security personnel at control center 60 may perform inquiry of the suspect person at checkpoint 12 of system 10 or any other unusual situation at premises 50. The security personnel may rely on relevant data which may be received from system 10, reflecting previous data which was collected by system 10, decisions which were taken at decisions points at system 10 and results of analysis performed at system 10, all with respect to the suspect person. A decision then may be taken at decision point 331 whether a person at premises 50 may be allowed to enter it. If the result at decision point 331 is 'yes' an authorizing signal to gates 14 at premises 50 may be issued by control center 60 via control unit 18 (block 308). If the result at decision point 331 with respect to whether the suspect person has passed the human inquiry is 'no' the personnel at control center 60 may monitor the suspect (block 306) using sensors 16 of system 10, to continuously verify, at decision point 332, whether the suspect at checkpoint 12, or any other evolving situation at premises 50, requires that intervening force will be sent to premises 50. If the result of the decision at decision point 332 is 'yes' then control center 60 may dispatch an intervention force to premises 50. If the result of the decision at decision point 332 is 'no' control center 60 may continue monitoring the suspect person at checkpoint 12 of premises 50, until he or she leaves the place.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
   at least one checkpoint positioned at an entry to premises, said at least one checkpoint comprising at least one controllable gate;
   at least two sensors associated with said at least one checkpoint adapted to sense information relating to a person at said checkpoint; and
   a control unit to receive data from said at least two sensors, wherein a first sensor of said at least two sensors is a microphone and a second sensor of said at least two sensors is a video camera; and wherein said control unit is adapted to analyze at least a vocal input and a video stream input of said person to determine an anxiety level of said person, and signal when said anxiety level indicates that said person is forced to enter to said premises.

2. The system of claim 1, further adapted to check whether said person is included in a list of tenants of said premises based on at least one human input received through said at least two sensors.

3. The system of claim 1, further adapted to check whether said person is included in a list of authorized visitors of said premises based on at least one human input received through said at least two sensors.

4. The system of claim 1 wherein said at least two sensors further comprise at least one additional sensor, wherein said at least one additional sensor is one of a list including an infrared sensor, and a weight sensor.

5. A method comprising:
   receiving indication of the presence of a person at a checkpoint of premises via a video camera;
   issuing a notification to said person to respond vocally;
   analyzing a video stream and a vocal response received from said person to identify whether said person is one of a tenant list;

analyzing said video stream and said vocal response, if said person is one of a tenant list, to identify if an anxiety level of said person is beyond a defined level which indicates said person is forced to enter said premises; and allowing entry of said person into said premises if said anxiety level of said person is not beyond said defined level.

6. The method of claim 5 further comprising:

performing additional verification inquiry to said person if said anxiety level of said person is beyond said defined level;

allowing entry of said person to said premises if said person has passed said additional verification inquiry; and preventing entry of said person into said premises if said person has not passed said additional verification inquiry and signaling to a control center of said preventing.

7. The method of claim 5 further comprising:

analyzing said video stream and said vocal response, if said person is not one of a tenant list, to identify if said person is one of a guest list;

analyzing said video stream and said vocal response, if said person is one of a guest list, to identify if said anxiety level of said person is beyond a defined level;

notifying a respective tenant of an expected guest, if said anxiety level of said person is not beyond a defined level and receiving entry approval from said respective tenant; and allowing entry of said person into said premises.

8. The method of claim 7 further comprising:

performing additional verification inquiry to said person if said person is not one of a guest list;

notifying a respective tenant of an expected guest, if said person passed said additional verification test and receiving entry approval from said respective tenant; and allowing entry of said person into said premises.

9. The method of claim 8 further comprising:

preventing entry of said person into said premises if said person has not passed said additional verification inquiry and signaling to a control center of said preventing.

* * * * *